United States Patent [19]

Serizawa et al.

[11] Patent Number: 6,001,921
[45] Date of Patent: Dec. 14, 1999

[54] FLAME RETARDANT RESIN COMPOSITION

[75] Inventors: Shin Serizawa; Masatoshi Iji, both of Tokyo, Japan

[73] Assignee: NEC Corporation, Tokyo, Japan

[21] Appl. No.: 08/954,264

[22] Filed: Oct. 20, 1997

Related U.S. Application Data

[63] Continuation-in-part of application No. 08/927,197, Sep. 11, 1997, abandoned.

[51] Int. Cl.[6] .................................................. C08L 83/00
[52] U.S. Cl. ...................... 524/506; 524/425; 524/426; 524/427; 524/451; 524/500; 524/504; 524/506; 524/508; 524/525; 524/537; 524/540; 525/105; 525/106
[58] Field of Search ...................................... 525/105, 106; 524/425, 426, 427, 451, 500, 504, 506, 508, 537, 525, 540, 860

[56] References Cited

U.S. PATENT DOCUMENTS 5,391,594  2/1995  Romenesko et al. .................... 523/212
5,403,891  4/1995  Romenesko ............................. 525/106

FOREIGN PATENT DOCUMENTS 0 415 070  3/1991  European Pat. Off. .

*Primary Examiner*—Mark L. Warzel
*Attorney, Agent, or Firm*—Young & Thompson

[57] ABSTRACT

A flame retardant resin composition comprises a silicone resin having specific structure and weight-average molecular weight and a non-silicone resin having aromatic-ring. The silicone resin has $R_2SiO_{1.0}$ units and $RSiO_{1.5}$ units. The weight-average molecular weight of the silicone resin is in the range of not less than 10,000 to not more than 270,000. R is hydrocarbon group.

16 Claims, 1 Drawing Sheet

FLAME RETARDANT RESIN COMPOSITION

This application is a continuation-in part of Ser. No. 08/927,197 which was filed on Sep. 11, 1997, now abandoned.

BACKGROUND OF THE INVENTION

The present invention relates to a flame retardant resin composition, and more particularly to a silicone resin acting as a flame retarder which provides a flame retardancy to non-silicone resin composition containing an aromatic ring Flame retardant resin compositions have been widely used for electric and electronic components and devices, building materials, automobile parts, daily necessities and the like. In general, such base material resin compositions are added with an organic halogen compound or added with both an organic halogen compound and antimony trioxide so that the base material resin compositions are provided with the flame retardancy. Such flame retardant resin material has a disadvantage that burning this flame retardant resin material causes generation of harmful halogen gases.

It has been known by one skilled in the art that in order to avoid the above disadvantage it is effective to add the base material resin composition with silicone thereby to provide the flame retardancy to the base material resin composition without generation harmful halogen gases when burning.

Silicone (organopolysiloxane) comprises at least any of the following four units (M-unit, D-unit, T-unit and Q-unit). Silicone resin in general includes at least any of T-unit and Q-unit.

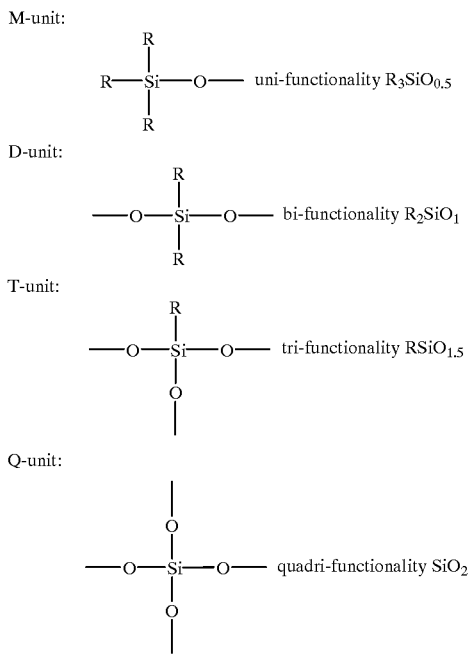

In the Japanese laid-open patent publication No. 1-318069, it is disclosed that a thermoplastic material is provided with flame retardancy by powdered polymer mixture which comprises a thermoplastic polymer and a silicone resin $(R_xSi(OR')_yO_{(4-x-y)/2})$ consisting of all of the above four units and also having either alkoxyl group or hydroxyl group.

In the Japanese laid-open patent publication No. 2-150436, it is disclosed that a thermoplastic material is provided with a flame retardancy by a mixture of the normal silicone powder such as dimethyl-silicone, metal hydroxide and zinc compound.

In the Japanese patent publication No. 62-60421, it is disclosed that a thermoplastic non-silicone polymer is provided with flame retardancy by polysiloxane containing 80% by weight or more of T-unit represented by $RSiO_{1.5}$. Particularly, it is preferable for providing the flame retardant to the polymer component that the molecular weight of the polysiloxane resin is not less than 2000 and not more than 6000 and R in the formula comprises not more than 80 mol % of phenyl group and the remaining percents of methyl group.

In the Japanese patent publication No. 3-48947, it is disclosed that a thermoplastic material is provided with a flame retardancy by a silicone resin, particularly a MQ silicone which comprises M-unit of $R_3SiO_{0.5}$ and Q-unit of $SiO_2$, silicone and Group IIA metal salts.

In the Japanese laid-open patent publication No. 1-318069 or No. 2-150436, the use of normal silicone resin alone results in an insufficient flame retardancy, for which reason flame retarder such as halogen compounds, phosphorus compounds, metal hydroxide may be used and added.

The specific silicone resins disclosed in the Japanese patent publications Nos. 62-60421 and 3-48947 have to be added at a large amount for obtaining a sufficient flame retardancy.

In the Japanese patent publication No. 62-60421, 10 parts by weight to 300 parts by weight of silicone resin, preferably 20 parts by weight to 100 parts by weight, are added to 100 parts by weight of non-silicone resin for flame retardancy. It is however disadvantageous that addition of such large amount of silicone resin results in remarkable deterioration of moldability and mechanical strength of the resin composition.

In the above circumstances, it had been required to develop a flame retardant resin composition having a high flame retardancy with addition of a small amount of silicone resin, and also having high moldability and mechanical strength.

SUMMARY OF THE INVENTION

Accordingly, it is an object of the present invention to provide a novel flame retardant resin composition free from the above problems and disadvantages.

It is a further object of the present invention to provide a novel flame retardant resin composition having a high flame retardancy with addition of a small amount of silicone resin.

It is a still further object of the present invention to provide a novel flame retardant resin composition having a high moldability.

It is yet a further object of the present invention to provide a novel flame retardant resin composition have a high mechanical strength.

It is yet a further object of the present invention to provide a novel flame retardant resin composition which generates almost no harmful halogen gases when burning this flame retardant resin composition.

The above and other objects, features and advantages of the present invention will be apparent from the following descriptions.

The present invention provides a novel flame retardant resin composition which comprises a silicone resin having specific structure and weight-average molecular weight and a non-silicone resin having an aromatic-ring. The silicone resin has $R_2SiO_{1.0}$ units and $RSiO_{1.5}$ units. The weight-average molecular weight of said silicone resin is not less than 10,000 and not more than 270,000. R is hydrocarbon group.

BRIEF DESCRIPTION OF THE DRAWINGS

Preferred examples of the present invention will be described in detail with reference to the accompanying drawings.

DISCLOSURE OF THE INVENTION

Figure 1:
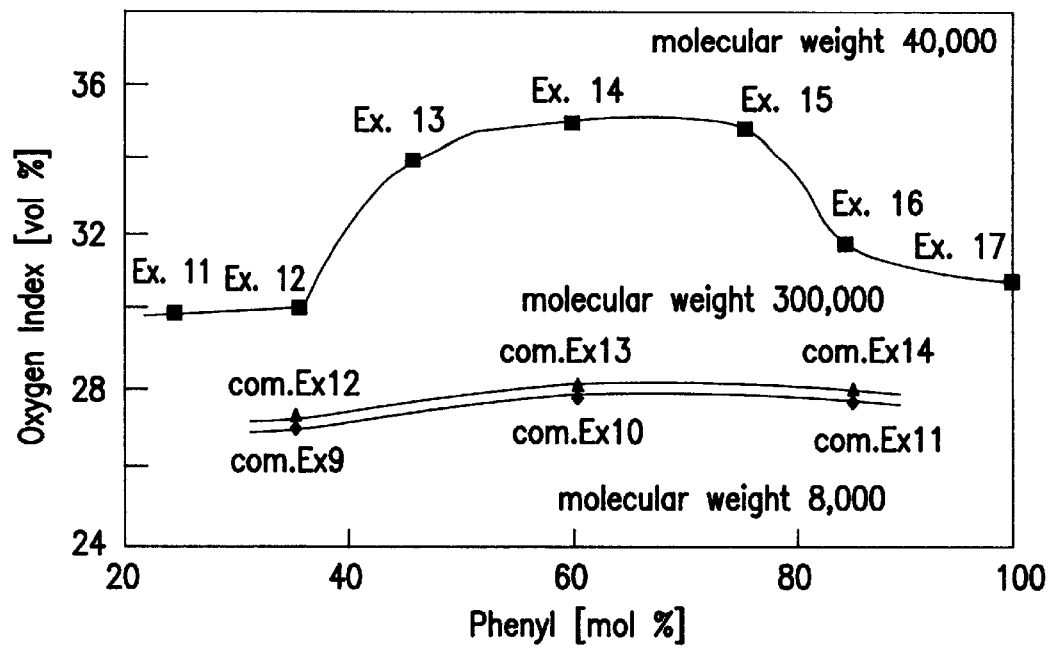
FIG. 1 is a graph illustrative of oxygen indexes of polycarbonate resins added with 4 phr of silicone resin versus weight-average molecular weight of the silicone resin and amount of phenyl in the silicone resin.

The present invention provides a novel flame retardant resin composition which comprises a silicone resin having specific structure and weight-average molecular weight (Mw) and a non-silicone resin having an aromatic-ring. The silicone resin has $R_2SiO_{1.0}$ units and $RSiO_{1.5}$ units. The weight-average molecular weight of said silicone resin is not less than 10,000 and not more than 270.000. R is hydrocarbon group.

The above aromatic ring may be rings which fall into aromatic rings such as benzene ring, condensed benzene ring, non-benzene aromatic ring, complex aromatic ring. The following naphthalene ring is one example of the condensed benzene ring and the following pyrolle ring is one example of the complex aromatic ring.

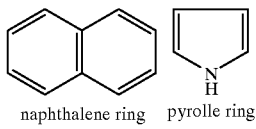

naphthalene ring   pyrolle ring

The above non-silicone resin may be thermoplastic resins having aromatic ring such as aromatic polycarbonate resin, alloys of aromatic polycarbonate resin, copolymers of acrylonitrile-butadiene-styrene (ABS) and polystyrene resin and also may be thermosetting resin having aromatic ring such as epoxy resin having aromatic ring and phenol resin having aromatic ring. Further, the above non-silicone resin may be a mixture of a plurality of the above thermosetting resins and/or thermoplastic resins Aromatic polycarbonate resin and alloys of it are preferable for providing flame retardancy.

As described above, the silicone resin has $R_2SiO_{1.0}$ units referred to as D-unit and $RSiO_{5.1}$ units referred to as T-unit. R is hydrocarbon group. The weight-average molecular weight of said silicone resin is not less than 10,000 and not more than 270,000. If the weight-average molecular weight of the silicone resin is less than 10000, then it is difficult to mix the silicone resin into the base material, resulting in insufficient flame retardancy effect. Further, the flame retardancy, specially a drip resistance of the resin composition against drip due to melting of the resin in combustion is decreased. If the weight-average molecular weight of the silicone resin exceeds 270,000, then an excessively high melting viscosity is obtained thereby lowering the mixability and moldability of the silicone resin with the non-silicone. Furthermore, the mobility of the silicone resin to the surface of the non-silicone resin is decreased in molding and combustion, whereby the formability of the flame retardant film with the silicone resin coating the non-silicone resin surface is lowered, resulting in a reduction of the flame retardancy effect.

A preferable mol ratio of the $RSiO_{1.5}$ unit to the $R_2SiO_{1.0}$ unit may be in the range of 0.5 to less than 7. If a ratio of $RSiO_{1.5}$ unit to $R_2SiO_{1.0}$ unit is less than 0.5, then the silicone resin tends to be in oil-state, thereby making it difficult to mix the silicone resin with the non-silicone resin. As a result, the moldability is then decreased. Since further the heat resistance of the silicone resin itself is decreased, the flame retardant effect to the non-silicone resin is lowered whereby the drip is likely to appear. If a ratio of $RSiO_{1.5}$ unit to the $R_2SiO_{1.0}$ unit is not less than 7, then the dispersion of the silicone resin into the non-silicone resin is made poor by stereo hindrance, and the condensation between phenyl groups in the silicone resin of the flame resistant film is unlikely to appear. As a result, the flame retardancy effect to the non-silicone resin is decreased.

Preferably, R of the $R_2SiO_{1.0}$ unit and the $RSiO_{1.5}$ unit of the silicone resin comprises methyl group and phenyl group. More preferably, a mol ratio of the phenyl group to R of the silicone resin is in the range of not less than 40% to less than 80%, and the remaining R is methyl group. If the mol ratio of phenyl group to R is less than 40%, then solubility with the non-silicone resin including aromatic-ring is lowered, whereby the mixability is decreased. Since further the flame resistant of silicone itself is decreased, then the flame retardancy effect to the non-silicone resin is also decreased. If, however, the mol ratio of phenyl group to R is not less than 80%, then the solubility with the non-silicone resin including aromatic-ring is excessively high, for which reason the mobility of the silicone resin to the non-silicone resin surface in molding and combustion of the non-silicone resin is decreased, thereby making it difficult to form the flame resistant film with the silicone resin on the non-silicone resin surface. As a result, the flame retardancy is lowered. Further, the condensation between phenyl groups in the silicone resin of die flame resistant film is prevented by the stereo-hindrance between phenyl groups in the silicone resin whereby the flame resistance of the film is decreased.

In the light of the flame resistance, it is preferable that the silicone resin comprises $R_2SiO_{1.0}$ units (D-unit) and $RSiO_{1.5}$ units (T-unit), in addition M-units which is terminated with $R'_3SiO_{0.5}$. R' in the formula is preferably a saturated hydrocarbon group and/or an aromatic hydrocarbon group, or a mixture of a saturated hydrocarbon group and/or an aromatic hydrocarbon group with hydroxyl group and/or alkoxyl group. It is more preferable that the hydroxyl group and/or alkoxyl group are less than 10% by mol ratio and the remaining is a methyl group and/or a phenyl group. If a mol ratio of the hydroxyl group and/or alkoxyl group is more than 10% to R, then a self condensation of the silicone resin is likely to occur in mixing with the non-silicone resin. As a result, the dispersion of the silicone resin into the non-silicone resin is decreased and the mobility of the silicone resin to the non-silicone resin surface in the molding and the combustion of the resin compositions is also decreased. The flame retardancy is therefore deteriorated.

It is preferable that the silicone resin is not less than 0.1 parts by weight and not more than 30 parts by weight to 100 parts by weight of the non-silicone resin. If the ratio of the silicone resin to the non-silicone resin is below that range, then the flame retardancy is lowered. If, however, the ratio of the silicone resin to the non-silicone resin is above that range, then the mechanical strength is weakened.

It is possible that a single kind of the silicone resin is mixed to a single kind of the non-silicone resin.

It is also possible that a plurality of kinds of the silicone resin is mixed to a single kind of the non-silicone resin.

It is also possible that a single kind of the silicone resin is mixed to a plurality of kinds of the non-silicone resin.

It is also possible that a plurality of kinds of the silicone resin is mixed to a plurality of kinds of the non-silicone resin.

It is further possible to optionally add a reinforcing agent into the flame retardant resin composition. The reinforcing agent may be antioxidant, neutralizer, ultraviolet ray absorbent, anti-static agent, pigment, dispersing agent, lubricant, thickener, filler, carbonization catalyst, anti-dripping agent and the others mixable in the resin composition.

Particularly, it is possible to improve the mixability with the non-silicone resin including aromatic ring by use of the silicone resin together with inorganic fillers such as silica powder, calcium carbonate powder and talc powder, particularly with silica powder. In this case, the flame retardancy can be kept better. An amount of the inorganic filler to be added is preferably 0.1 times or more by weight ratio to the silicone resin.

The following descriptions will focus on a method of preparing the above flame retardant resin composition in accordance with the present invention.

As the non-silicone resin having aromatic ring, used are aromatic polycarbonate resin, alloys of aromatic polycarbonate resin, copolymers of acrylonitrile-butadiene-styrene (ABS) and polystyrene resin and also may be thermosetting resin having aromatic ring such as epoxy resin having aromatic ring and phenol resin having aromatic ring. Further, the above non-silicone resin may be a mixture of a plurality of the above resins.

The silicone resin may be prepared by the general method. Namely, in accordance with the weight-average molecular weight of the silicone resin composition and a ratio of the $RSiO_{1.5}$ unit to the $R_2SiO_{1.0}$ unit, diorgano-dichloro-silane and monoorgano-trichloro-silane are hydrolyzed and partially condensed to form a silicone resin. Further, the silicone resin is then reacted with triorgano-chloro-silane to terminate polymerization whereby the silicone resin is terminated with the bridging terminal group of $R'_3SiO_{0.5}$ unit.

The property of the silicone resin depends upon the weight-average molecular weight, a ratio of the $RSiO_{1.5}$ unit (T-unit) and the $R_2SiO_{1.0}$ unit (D-unit) and a ratio of phenyl group to methyl group in R. The measurement of the molecular weight may be carried out by gel permeation chromatography (GPC) in the same manner as for the general polymers. The general formula of the silicone resin is as follows

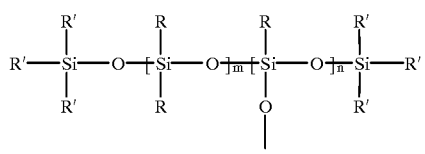

The weight-average molecular weight of the silicone resin is in the range of not less than 10,000 to not more than 270,000. The weight-average molecular weight of the silicone resin is controllable by controlling a time of reaction for preparing the silicone resin.

The ratio of $RSiO_{1.5}$ unit (T-unit) to $R_2SiO_{1.0}$ unit (D-unit) in the silicone resin is adjustable by the amounts in use of diorgano-dichloro-silane and monoorgano-trichloro-silane. Chlorine in the raw materials for the silicone resin is made into hydrochloric acid during the hydrolyzing reaction and is removed whereby no chlorine is included in the silicone resin. The preferable mol ratio of $RSiO_{1.5}$ unit (T-unit) to $R_2SiO_{1.0}$ unit (D-unit) is in the range of not less than 0.5 to less than 7.

A ratio of phenyl group to methyl group in R is adjustable by amounts in use of both methyl-silane raw materials such as dimethyl-dichloro-silane and monomethyl-trichloro-silane and phenyl silane raw materials such as diphenyl-dichloro-silane and monophenyl-trichloro-silane.

The non-silicone resin and the silicone resin are weighed and then mixed with each other to be formed using the same apparatus as when used to form usual plastic materials Namely, a pre-mixing device such as ribbon blender and Henshell Mixer are used to pre-mix and disperse the non-silicone resin and the silicone resin, and then a mixing device such as Bumbury's roll and extruder is used to mix the non-silicone resin and the silicone resin to form the intended material. If the silicone resin is not solid in the ordinary temperature, then the silicone resin is directly mixable with the non-silicone resin using the mixing device.

After mixing the silicone resin to the non-silicone resin, the mixture is defined by injection molding, extrusion molding, compression molding and vacuum molding thereby to obtain the flame retardant resin material.

After molding, in accordance with JIS K7201 (burning examination of polymer material in oxygen index), the evaluation on flame retardancy is made. The burning examination of polymer material in oxygen index means a method for confirming whether or not a predetermined size sample peace is continuously burned for a time not less than 3 minutes and also determining a minimum flow rate of oxygen and a corresponding nitrogen flow rate both of which are necessary for continuing the flame length of not less than 50 mm. The confirmed minimum oxygen concentration (vol %) is oxygen index. As the oxygen index is high, then the flame retardancy is high.

As described above, the novel flame retardant resin composition comprises a silicone resin having specific structure and weight-average molecular weight and a non-silicone resin having aromatic-ring. The silicone resin has $R_2SiO_{1.0}$ units (D-unit) and $RSiO_{1.5}$ units (T-unit). The weight-average molecular weight of the silicone resin is in the range of not less than 10,000 to not more than 270,000. R is hydrocarbon group. The novel flame retardant resin composition in accordance with the present invention has a high flame retardancy with addition of a small amount of silicone resin without, however, generation of harmful halogen gases when burning this flame retardant resin composition

EXAMPLES

Example 1

Thirty seven kinds of silicone resins "1"–"37" were synthesized by varying the weight-average molecular weight of the silicone resin and the ratio of $RSiO_{1.5}$ unit to $R_2SiO_{1.0}$ unit as well as the ratio of phenyl group to methyl group in the hydrocarbon group R. R is hydrocarbon group. The following table 1 shows the weight-average molecular weight of the silicone resin and the ratio of $RSiO_{1.5}$ unit to $R_2SiO_{1.0}$ unit as well as the ratio of phenyl group to methyl group in the hydrocarbon group R for every silicone resins "1"–"37". The silicone resins on Table 1 are terminated with excessive amount of trimethyl-chloro-silane.

TABLE 1

| Resin | Molecular Weight | $RSiO_{1.5}$-To-$R_2Si_{1.0}$ Ratio | Phenyl-To-Methyl Ratio |
|---|---|---|---|
| "1" | 5,000 | 1:0 | 70:30 |
| "2" | 6,000 | 1:1 | 25:75 |
| "3" | 8,000 | 0.4:1 | 70:30 |
| "4" | 12,000 | 1:0 | 0:100 |
| "5" | 40,000 | 0:1 | 40:60 |
| "6" | 12,000 | 0.4:1 | 15:85 |
| "7" | 25,000 | 7.5:1 | 85:15 |
| "8" | 50,000 | 7.5:1 | 85:15 |
| "9" | 12,000 | 0.5:1 | 15:85 |
| "10" | 50,000 | 6.5:1 | 85:15 |
| "11" | 12,000 | 0.5:1 | 50:50 |
| "12" | 40,000 | 1:1 | 40:60 |
| "13" | 50,000 | 3:1 | 75:25 |
| "14" | 300,000 | 3:1 | 60:40 |
| "15" | 4,000 | 4:1 | 60:40 |
| "16" | 8,000 | 4:1 | 35:65 |
| "17" | 8,000 | 4:1 | 60:40 |
| "18" | 5,000 | 4:1 | 85:15 |
| "19" | 12,000 | 4:1 | 60:40 |
| "20" | 40,000 | 4:1 | 25:75 |
| "21" | 40,000 | 4:1 | 35:65 |
| "22" | 40,000 | 4:1 | 45:55 |
| "23" | 40,000 | 4:1 | 60:40 |
| "24" | 40,000 | 4:1 | 75:25 |
| "25" | 40,000 | 4:1 | 85:15 |
| "26" | 40,000 | 4:1 | 100:0 |
| "27" | 270,000 | 4:1 | 60:40 |
| "28" | 300,000 | 4:1 | 35:65 |
| "29" | 300,000 | 4:1 | 60:40 |
| "30" | 300,000 | 4:1 | 85:15 |
| "31" | 500,000 | 4:1 | 60:40 |
| "32" | 40,000 | 0.4:1 | 35:65 |
| "33" | 40,000 | 0.4:1 | 60:40 |
| "34" | 40,000 | 0.4:1 | 85:15 |
| "35" | 40,000 | 7.5:1 | 35:65 |
| "36" | 40,000 | 7.5:1 | 60:40 |
| "37" | 40,000 | 7.5:1 | 85:15 | where the ratio of $RSiO_{1.5}$ unit to $R_2SiO_{1.0}$ unit as well as the ratio of phenyl group to methyl group are mol ratios.

The novel flame retardant resin composition comprises a silicone resin having specific stricture and weight-average molecular weight and a non-silicone resin having aromatic-ring. The silicone resin has $R_2SiO_{1.0}$ units and $RSiO_{1.5}$ units. The weight-average molecular weight of the silicone resin is in the range of not less than 10000 to not more than 270,000. R is hydrocarbon group, in particular methyl group and phenyl group. The silicone resins "6"–"13", "19"–"27", and "32"–"37" are the resin to be used in the novel flame retardant resin composition in the preferred examples according to the present invention. By contrast, the silicone resins "1"–"5", "14"–"18", and "28"–"31" are the resin to be used in the flame retardant resin composition in the comparative examples. The silicone resin "14" is high in weight-average molecular weight so that the melting viscosity is too high to mix the silicone resin with the non-silicone resin, for example, polycarbonate resin at usual mixing temperatures as shown later.

As the non-silicone resin, used was bis-phenol A-polycarbonate resin (Sumitomo Dow Co—Calibre 301-10) or alloys of bis-phenol A-polycarbonate resin and ABS (Sumitomo Dow Co—H-270, hereinafter referred to as PC/ABS), or polystyrene resin (Shinnitetsu Chemical Co. H-65). The silicone resin and the non-silicone resin. were milled and mixed using an extruder mixer at a temperature of 280° C., preferably in tie range of 270° C. to 290° C., when polycarbonate resin is used or at a temperature of 260° C., preferably in the range of 250° C. to 270° C., when PC/ABS is used and at a temperature of 220° C., preferably in the range of 210° C. to 230° C., when polystyrene resin is used.

In co-use of the above bis-phenol A-polycarbonate resin (Sumitomo Dow Co—Calibre 301-10) with either silica powder A (Denki Kagaku Co. FB-48: 16 $\mu$m of averaged particle diameter) or silica powder B (Nippon Aerosil Co. AEROSIL130: 16 nm of averaged particle diameter), the silicone resins (6, 9, 11) were mixed using the extruder. The mixing temperature was at 280° C.

After drying at 120° C. for 3 hours, the mixed resin compositions were molded at a temperature of 270° C. when the polycarbonate is used at a temperature of 240° C. when PC/ABS alloy is used, and at a temperature of 200° C. when the polystyrene is used The molded plate is processed to a sample piece of a length 150 mm, a width of 6.5±0.5 mm so that in accordance with JIS K7201(burning examination of polymer material in oxygen index), the evaluation on flame retardancy is made to find oxygen index.

Figure 2:
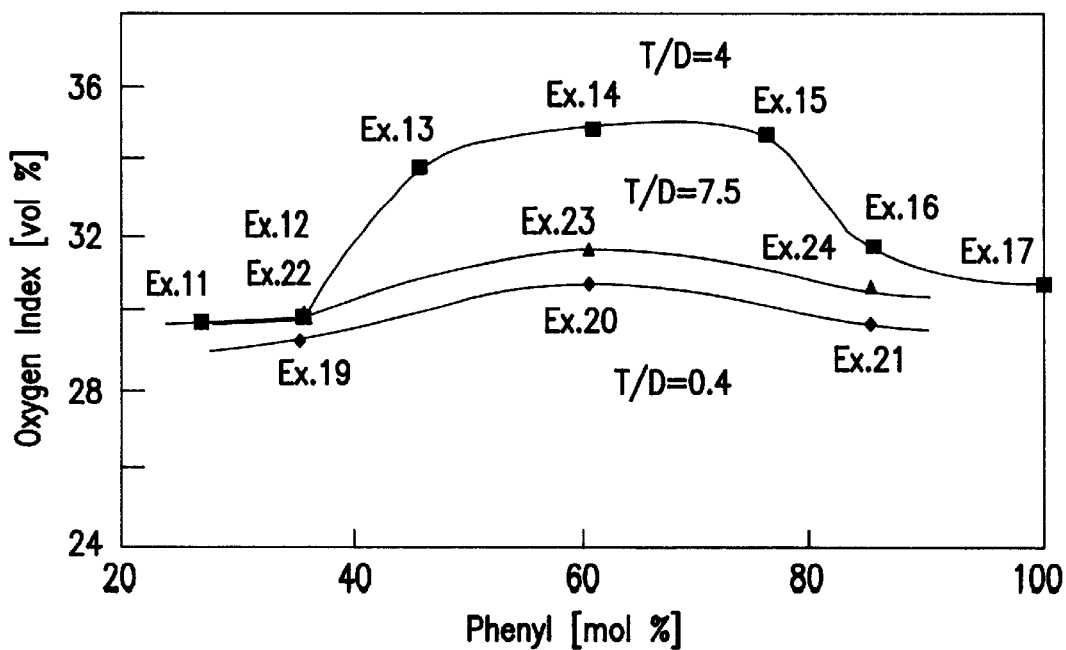
FIG. 2 is a graph illustrative of oxygen indexes of polycarbonate resins added with 4 phr of silicone resin versus T-unit to D-unit ratio of the silicone resin and amount of phenyl in the silicone resin.

The following Tables 2–10 and FIGS. 1–2 show amounts of the silicone resin with reference to 100 parts by weight of the non-silicone resin and an oxygen index for every resin compositions.

The following Tables 11–12 show amounts of the silicone resin and silica powder with reference to 100 parts by weight of the non-silicone resin and mixability for every resin compositions.

The following Tables 2 and 3 show amounts of the silicone resins with reference to 100 parts by weight of the non-silicone resin and an oxygen index for various resin compositions in comparative example when no silicone resin is added or when the weight-average molecular weight is less than 10000 or when the silicone resin does not have $RSiO_{1.5}$ unit or $R_2SiO_{1.0}$ unit.

TABLE 2

| | (Unit:parts by weight) | | |
| --- | --- | --- | --- |
| | Example 1 | Example 2 | Example 3 |
| Polycarbonate (non-silicone) | 100 | 100 | 100 |
| Silicone resin "6" | 4 | — | — |
| Silicone resin "7" | — | 4 | — |
| Silicone resin "8" | — | — | 4 |
| Evaluation (oxygen index) | 31 | 30 | 31 |

TABLE 3

| | (Unit:parts by weight) | | |
| --- | --- | --- | --- |
| | Com. Ex. 1 | Com. Ex. 2 | Com. Ex. 3 |
| Polycarbonate (non-silicone) | 100 | 100 | 100 |
| Silicone resin "1" | — | 4 | — |
| Silicone resin "2" | — | — | 4 |
| Silicone resin "3" | — | — | — |
| Silicone resin "4" | — | — | — |
| Silicone resin "5" | — | — | — |
| Evaluation (oxygen index) | 26 | 27 | 28 |

| | (Unit:parts by weight) | | |
| --- | --- | --- | --- |
| | Com. Ex. 4 | Com. Ex. 5 | Com. Ex. 6 |
| Polycarbonate (non-silicone) | 100 | 100 | 100 |
| Silicone resin "1" | — | — | — |
| Silicone resin "2" | 9 | — | — |

TABLE 3-continued

| | | | |
|---|---|---|---|
| Silicone resin "3" | — | 4 | — |
| Silicone resin "4" | — | — | 4 |
| Silicone resin "5" | — | — | — |
| Evaluation (oxygen index) | 29 | 27 | 27 |

| | (Unit:parts by weight) Com. Ex. 7 |
|---|---|
| Polycarbonate (non-silicone) | 100 |
| Silicone resin "1" | — |
| Silicone resin "2" | — |
| Silicone resin "3" | — |
| Silicone resin "4" | — |
| Silicone resin "5" | 4 |
| Evaluation (oxygen index) | 26 |

From Tables 2 and 3, it is understood that the polycarbonate resin compositions containing the silicone resins "6", "7", "8" in Examples 1, 2 and 3 are high in oxygen index than the polycarbonate resin compositions containing the silicone resins "1", "2", "3", "4", "5" in Comparative Examples 2–7 and also than the polycarbonate resin free of silicone resin in Comparative Example 1. The flame retardant resin compositions of Examples 1, 2 and 3 comprise a silicone resin and a non-silicone resin having aromatic-ring, wherein the silicone resin has $R_2SiO_{1.0}$ units and $RSiO_{1.5}$ units, and the weight-average molecular weight of the silicone resin is in the range of not less than 10000 to not more than 270,000, and R is hydrocarbon groups, in particular methyl group and phenyl group The flame retardant resin compositions of Examples 1, 2 and 3 are higher in flame retardancy than Comparative Examples 1–7. The following Table 4 shows dependency of the oxygen index upon the ratio of $RSiO_{1.5}$ unit to $R_2SiO_{1.0}$ unit and the ratio of methyl group and phenyl group.

TABLE 4

| | (Unit:parts by weight) | | |
|---|---|---|---|
| | Example 4 | Example 5 | Example 6 |
| Polycarbonate (non-silicone) | 100 | 100 | 100 |
| Silicone resin "9" | 4 | — | — |
| Silicone resin "10" | — | 4 | — |
| Silicone resin "11" | — | — | 4 |
| Silicone resin "12" | — | — | — |
| Silicone resin "13" | — | — | — |
| Evaluation (oxygen index) | 32 | 33 | 36 |

| | (Unit:parts by weight) | | |
|---|---|---|---|
| | Example 7 | Example 8 | Example 9 |
| Polycarbonate (non-silicone) | 100 | 100 | 100 |
| Silicone resin "9" | — | — | — |
| Silicone resin "10" | — | — | — |
| Silicone resin "11" | — | — | — |
| Silicone resin "12" | 4 | 9 | — |
| Silicone resin "13" | — | — | 4 |
| Evaluation (oxygen index) | 35 | 37 | 35 |

From Examples 4 and 5, it is understood that the polycarbonate resin compositions containing the silicone resin "9" or "10" in Examples 4 and 5, where the mol ratio of T-units to D-units is in the range of not less than 0.5 to less than 7, are further higher in oxygen index than the polycarbonate resin compositions containing the silicone resins in Examples 1–3 and in Comparative Examples 1–7. The flame retardant resin compositions of Examples 4 and 5 are further higher in flame retardancy than Examples 1–3 and Comparative Examples 1–7. From Examples 6–9, it is understood that the polycarbonate resin compositions containing the silicone resins "11", "12", "13" in Examples 6–9, where a mol ratio of phenyl group to methyl group in R is in the range of not less than 40% to less than 80%, are further higher in oxygen index than the polycarbonate resin compositions containing the silicone resins in. Examples 1–5 and in Comparative Examples 1–7. The flame retardant resin compositions of Examples 6–9 are further higher in flame retardancy than Examples 1–5 and Comparative Examples 1–7. The following Table 5 shows dependency of the oxygen index upon the mol ratio of T-units to D-units and the mol ratio of phenyl to methyl in R.

TABLE 5

| | (Unit:parts by weight) | | |
|---|---|---|---|
| | Example 10 | Example 11 | Example 12 |
| Polycarbonate | 100 | 100 | 100 |
| Silicone resin "15" | — | — | — |
| Silicone resin "16" | — | — | — |
| Silicone resiti "17" | — | — | — |
| Silicone resin "18" | — | — | — |
| Silicone resin "19" | 4 | — | — |
| Silicone resin "20" | — | 4 | — |
| Silicone resin "21" | — | — | 4 |
| Silicone resin "22" | — | — | — |
| Evaluation (oxygen index) | 35 | 30 | 30 |

| | (Unit:parts by weight) Example 13 |
|---|---|
| Polycabonate | 100 |
| Silicone resin "15" | — |
| Silicone resin "16" | — |
| Silicone resin "17" | — |
| Silicone resin "1 8" | — |
| Silicone resin "19" | — |
| Silicone resin "20" | — |
| Silicone resin "21" | — |
| Silicone resin "22" | 4 |
| Evaluation (oxygen index) | 34 |

| | (Unit:parts by weight) | | |
|---|---|---|---|
| | Com. Ex. 8 | Com. Ex. 9 | Com. Ex. 10 |
| Polycabonate | 100 | 100 | 100 |
| Silicone resin "15" | 4 | — | — |
| Silicone resin "16" | — | 4 | — |
| Silicone resin "17" | — | — | 4 |
| Silicone resin "18" | — | — | — |
| Silicone resin "19" | — | — | — |
| Silicone resin "20" | — | — | — |
| Silicone resin "21" | — | — | — |
| Silicone resin "22" | — | — | — |
| Evaluation (oxygen index) | 26 | 27 | 28 |

| | (Unit:parts by weight) Com. Ex. 11 |
|---|---|
| Polycabonate | 100 |
| Silicone resin "15" | — |
| Silicone resin "16" | — |
| Silicone resin "17" | — |
| Silicone resin "18" | 4 |
| Silicone resin "19" | — |
| Silicone resin "20" | — |
| Silicone resin "21" | — |
| Silicone resin "22" | — |
| Evaluation (oxygen index) | 28 |

TABLE 6

(Unit:parts by weight)

|  | Example 14 | Example 15 | Example 16 |
|---|---|---|---|
| Polycarbonate | 100 | 100 | 100 |
| Silicone resin "23" | 4 | — | — |
| Silicone resin "24" | — | 4 | — |
| Silicone resin "25" | — | — | 4 |
| Silicone resin "26" | — | — | — |
| Silicone resin "27" | — | — | — |
| Silicone resin "28" | — | — | — |
| Silicone resin "29" | — | — | — |
| Silicone resin "30" | — | — | — |
| Evaluation (oxygen index) | 35 | 35 | 32 |

(Unit:parts by weight)

|  | Example 17 | Example 18 |
|---|---|---|
| Polycarbonate | 100 | 100 |
| Silicone resin "23" | — | — |
| Silicone resin "24" | — | — |
| Silicone resin "25" | — | — |
| Silicone resin "26" | 4 | — |
| Silicone resin "27" | — | 4 |
| Silicone resin "28" | — | — |
| Silicone resin "29" | — | — |
| Silicone resin "30" | — | — |
| Evaluation (oxygen index) | 31 | 34 |

(Unit:parts by weight)

|  | Com. Ex. 2 | Com. Ex. 13 | Com. Ex. 14 |
|---|---|---|---|
| Polycarbonate | 100 | 100 | 100 |
| Silicone resin "23" | — | — | — |
| Silicone resin "24" | — | — | — |
| Silicone resin "25" | — | — | — |
| Silicone resin "26" | — | — | — |
| Silicone resin "27" | — | — | — |
| Silicone resin "28" | 4 | — | — |
| Silicone resin "29" | — | 4 | — |
| Silicone resin "30" | — | — | 4 |
| Evaluation (oxygen index) | 27 | 28 | 28 |

TABLE 7

(Unit:parts by weight)

|  | Example 19 | Example 20 | Example 21 |
|---|---|---|---|
| Polycarbonate | 100 | 100 | 100 |
| Silicone resin "31" | — | — | — |
| Silicone resin "32" | 4 | — | — |
| Silicone resin "33" | — | 4 | — |
| Silicone resin "34" | — | — | 4 |
| Silicone resin "35" | — | — | — |
| Silicone resin "36" | — | — | — |
| Silicone resin "37" | — | — | — |
| Evaluation (oxygen index) | 30 | 31 | 30 |

(Unit:parts by weight)

|  | Example 22 | Example 23 | Example 24 |
|---|---|---|---|
| Polycarbonate | 100 | 100 | 100 |
| Silicone resin "31" | — | — | — |
| Silicone resin "32" | — | — | — |
| Silicone resin "33" | — | — | — |
| Silicone resin "34" | — | — | — |
| Silicone resin "35" | 4 | — | — |
| Silicone resin "36" | — | 4 | — |
| Silicone resin "37" | — | — | 4 |
| Evaluation (oxygen index) | 30 | 32 | 31 |

(Unit:parts by weight)

TABLE 7-continued

|  | Com. Ex. 15 |
|---|---|
| Polycarbonate | 100 |
| Silicone resin "3 1" | 4 |
| Silicone resin "32" | — |
| Silicone resin "33" | — |
| Silicone resin "34" | — |
| Silicone resin "35" | — |
| Silicone resin "36" | — |
| Silicone resin "37" | — |
| Evaluation (oxygen index) | 28 |

On Tables 5 and 6, Comparative Examples 8–14 and Examples 10–18 as well as FIG. 1 show the oxygen indexes when the polycarbonate resin is added with 4 phr of silicone resins varying in the weight-average molecular weight and a mol ratio of phenyl in R.

On Tables 5 through 7, Examples 11–17 as well as FIG. 2 show the oxygen indexes when the polycarbonate resin is added with 4 phr of silicone resins varying in the T-unit to D-unit ratio and a mol ratio of phenyl in R.

On Tables 5 through 7, Comparative Examples 8, 10, 13, 15 and Examples 10, 14, 18 show the oxygen indexes when the polycarbonate resin is added with 4 phr of silicone resins varying in the weight-average molecular weight.

FIG. 1 is a graph which shows the oxygen indexes when the polycarbonate resin is added with 4 phr of silicone resins varying in the weight-average molecular weight and a mol ratio of phenyl in R.

FIG. 2 is a graph which shows the oxygen indexes when the polycarbonate resin is added with 4 phr of silicone resins varying in the T-unit to D-unit ratio and a mol ratio of phenyl in R.

From Tables 5–7 and FIGS. 1 an 2, it is understood that the silicone resins are capable of remarkably increasing the flame resistance of the polycarbonate including aromatic ring, wherein the silicone resins have a mol ratio of T-units to D-units in the range of not less than 0.5 to less than 7 and also have a weight-average molecular weight in the range of not less than 10000 to not more than 270,000, where a mol ratio of phenyl group to methyl group in R is in the range of not less than 40% to less than 80%.

Influence of the terminal group in the silicone resin will be described.

In synthesizing the silicone resin, compounding amounts of trimethyl-methoxy-silane, methyl-trimethoxy-silane, vinyl-trimethoxy-silane, and triphenyl-methoxy-silane were adjusted before all of the silane added were reacted with the silicone resin to synthesize eleven kinds of silicone resins differing in terminal functional group (M-unit). The silicone resin was added at 4 phr to the polycarbonate resin.

The following Table 8 shows dependency of the oxygen index and dripping upon various kinds of silane added. The evaluation on dripping was carried out in the following manners. Pellets of polycarbonate resins added with the silicone resins were used to form sample pieces having a thickness of 3.0 mm by compression method at 270° C. The sample pieces are cut to a size of 125±5 mm in length and 13.0±0.5 mm in width. In accordance with 20 mm vertical combustion test (UL94V) defined by Underwriters Laboratories, the dripping probability after applying flame for 10 seconds was evaluated. All of the silicone resins on table 8 have a weight-average molecular weight of 40,000 and a T-units to D-units mol ratio of 4:1 as well as a phenyl-to-methyl mol ratio of 60:40.

TABLE 8

|  |  | Example 25 | Example 26 | Example 27 |
|---|---|---|---|---|
| Added Silane (Terminal Group of Added Silane) *1 | trimethyl-methoxy-silane (trimethyl) | 100 | 95 | 90 |
| | methyl-trimethoxy-silane (methyl-dimethoxy) | 0 | 5 | 10 |
| | vinyl-trimethoxy-silane (vinyl-dimethoxy) | 0 | 0 | 0 |
| | triphenyl-methoxy-silane (triphenyl) | 0 | 0 | 0 |
| Ratio*2 | hydroxyl group | — | — | — |
| | alkoxyl group | 0% | 3% | 7% |
| Evaluation | Evaluation 1 (oxygen index) | 35 | 35 | 34 |
| | Evaluation 2 (dripping)*3 | ○ | ○ | ○ |

*1: compounding amounts of each silane are expressed in relative amounts (mol %) when the amount of silane in Example 25 is 100. Residual hydroxyl group is less than 3%. Hydroxyl groups are included at less than 3% in Examples 26–33 and 35.
*2: Ratio: A mol ratio of hydroxyl group or alkoxyl group in total terminal groups(R'). In Example 34, the terminal is hydrolyzed D-unit $(R_2(OH)SiO_{0.5})$.
*3: ○: good (No drip in five samples)
Δ: not good (one or two drips in five samples)
x: bad (three or more drips in five samples)

|  |  | Example 28 | Example 29 | Example 30 |
|---|---|---|---|---|
| Added Silane (Terminal Group of Added Silane) *1 | trimethyl-methoxy-silane (trimethyl) | 85 | 80 | 40 |
| | methyl-trimethoxy-silane (methyl-dimethoxy) | 15 | 20 | 60 |
| | vinyl-trimethoxy-silane (vinyl-dimethoxy) | 0 | 0 | 0 |
| | triphenyl-methoxy-silane (triphenyl) | 0 | 0 | 0 |
| Ratio*2 | hydroxyl group | — | — | — |
| | alkoxyl group | 10% | 14% | 40% |
| Evaluation | Evaluation 1 (oxygen index) | 34 | 34 | 33 |

*1: compounding amounts of each silane are expressed in relative amounts (mol %) when the amount of silane in Example 25 is 100. Residual hydroxyl group is less than 3%. Hydroxyl groups are included at less than 3% in Examples 26–33 and 35.
*2: Ratio: A mol ratio of hydroxyl group or alkoxyl group in total terminal groups(R'). In Example 34, the terminal is hydrolyzed D-unit $(R_2(OH)SiO_{0.5})$.
*3: ○: good (No drip in five samples)
Δ: not good (one or two drips in five samples)
x: bad (three or more drips in five samples)

|  |  | Example 31 | Example 32 | Example 33 |
|---|---|---|---|---|
| Added Silane (Terminal Group of Added Silane) *1 | trimethyl-methoxy-silane (trimethyl) | 0 | 90 | 0 |
| | methyl-trimethoxy-silane (methyl-dimethoxy) | 100 | 0 | 0 |
| | vinyl-trimethoxy-silane (vinyl-dimethoxy) | 0 | 10 | 100 |
| | triphenyl-methoxy-silane (triphenyl) | 0 | 0 | 0 |
| Ratio*2 | hydroxyl group | — | — | — |
| | alkoxyl group | 66% | 7% | 66% |
| Evaluation | Evaluation 1 (oxygen index) | 33 | 34 | 33 |
| | Evaluation 2 (dripping)*3 | x | x | x |

*1: compounding amounts of each silane are expressed in relative amounts (mol %) when the amount of silane in Example 25 is 100. Residual hydroxyl group is less than 3%. Hydroxyl groups are included at less than 3% in Examples 26–33 and 35.
*2: Ratio: A mol ratio of hydroxyl group or alkoxyl group in total terminal groups(R'). In Example 34, the terminal is hydrolyzed D-unit $(R_2(OH)SiO_{0.5})$.

TABLE 8-continued

*3: ○: good (No drip in five samples)
Δ: not good (one or two drips in five samples)
x: bad (three or more drips in five samples)

|  |  | Example 34 | Example 35 |
|---|---|---|---|
| Added Silane (Terminal Group of Added Silane) *1 | trimethyl-methoxy-silane (trimethyl) | 0 | 90 |
| | methyl-trimethoxy-silane (methyl-dimethoxy) | 0 | 0 |
| | vinyl-trimethoxy-silane (vinyl-dimethoxy) | 0 | 0 |
| | triphenyl-methoxy-silane (triphenyl) | 0 | 100 |
| Ratio*2 | hydroxyl group | 33% | — |
| | alkoxyl group | 0% | 0% |
| Evaluation | Evaluation 1 (oxygen index) | 33 | 34 |
| | Evaluation 2 (dripping)*3 | x | ○ |

*1: compounding amounts of each silane are expressed in relative amounts (mol %) when the amount of silane in Example 25 is 100. Residual hydroxyl group is less than 3%. Hydroxyl groups are included at less than 3% in Examples 26–33 and 35.
*2: Ratio: A mol ratio of hydroxyl group or alkoxyl group in total terminal groups(R'). In Example 34, the terminal is hydrolyzed D-unit $(R_2(OH)SiO_{0.5})$.
*3: ○: good (No drip in five samples) Δ: not good (one or two drips in five samples) x: bad (three or more drips in five samples)

From Examples 25–35, it is understood that the silicone resins of Examples 25–27, and 35 comprise D-units $(R_2SiO_{1.0})$, T-units $(RSiO_{1.5})$, and M-unit $(R'_3SiO_{0.5})$ and also have a weight-average molecular weight in the range of not less than 10,000 to not more than 270,000, where R comprises phenyl group and methyl group and where hydroxyl group and/or methoxy group in R' are in the range of less than 10% by mol ratio and the remaining are methyl group and/or phenyl group, and the polycarbonate resin compositions including those silicone resins are higher in flame retardancy than and remarkably improved in anti-dripping rather than the polycarbonate resin compositions including the silicone resins free of the above characteristics in Examples 28–34.

The following Table 9 shows dependency of the oxygen index when PC/ABS is used as the non-silicone resin including aromatic-ring.

TABLE 9

| (Unit:parts by weight) | | | |
|---|---|---|---|
| | Example 36 | Example 37 | Example 38 |
| PC/ABS (non-silicone) | 100 | 100 | 100 |
| Silicone resin "2" | — | — | — |
| Silicone resin "4" | — | — | — |
| Silicone resin "6" | 4 | — | — |
| Silicone resin "9" | — | 9 | — |
| Silicone resin "12" | — | — | 9 |
| Evaluation (oxygen index) | 23 | 25 | 26 |

| (Unit:parts by weight) | | | |
|---|---|---|---|
| | Com. Ex. 16 | Com. Ex. 17 | Com. Ex. 38 |
| PC/ABS (non-silicone) | 100 | 100 | 100 |
| Silicone resin "2" | — | 9 | — |
| Silicone resin "4" | — | — | 4 |
| Silicone resin "6" | — | — | — |
| Silicone resin "9" | — | — | — |
| Silicone resin "12" | — | — | — |
| Evaluation (oxygen index) | 19 | 20 | 19 |

From Examples 36–38 and Comparative Examples 16–18, it is understood that the PC/ADS compositions of Examples 36–38 contain the silicone resins (6, 9, 12) which have both $R_2SiO_{1.0}$ unit (D-unit) and $RSiO_{1.5}$ unit (T-unit) and also have a weight-average molecular weight in the range of not less than 10,000 to not more than 270,000, and where R is hydrocarbon group. The PC/ABS compositions of Examples 36–38 are higher in oxygen index than the PC/ABS compositions containing the silicone resins (2, 4) in Comparative Examples 17–18, and PC/ABS composition free of silicone resin in Comparative Example 16. The flame retardant resin compositions of Examples 36–38 are higher in flame retardancy than Comparative Examples 16–18.

The following Table 10 shows dependency of the oxygen index when polystyrene resin is used as the non-silicone resin including aromatic-ring.

TABLE 10

| (Unit:parts by weight) | | | |
|---|---|---|---|
| | Example 39 | Example 40 | Example 41 |
| Polystyrene (non-silicone) | 100 | 100 | 100 |
| Silicone resin "2" | — | — | — |
| Silicone resin "4" | — | — | — |
| Silicone resin "6" | 4 | — | — |
| Silicone resin "9" | — | 9 | — |
| Silicone resin "12" | — | — | 9 |
| Evaluation (oxygen index) | 22 | 24 | 25 |

| (Unit:parts by weight) | | | |
|---|---|---|---|
| | Com. Ex. 19 | Com. Ex. 20 | Com. Ex. 21 |
| Polystyrene (non-silicone) | 100 | 100 | 100 |
| Silicone resin "2" | — | 9 | — |
| Silicone resin "4" | — | — | 4 |
| Silicone resin "6" | — | — | — |
| Silicone resin "9" | — | — | — |
| Silicone resin "12" | — | — | — |
| Evaluation (oxygen index) | 18 | 19 | 18 |

From Examples 39–41 and Comparative Examples 19–21, it is understood that the polystyrene resin compositions of Examples 39–41 contain the silicone resins (6, 9, 12) which have both $R_2SiO_{1.0}$ unit (D-unit) and $RSiO_{1.5}$ unit (T-unit) and also have a weight-average molecular weight in the range of not less than 10,000 to not more than 270,000, and where R is hydrocarbon group. The polystyrene resin compositions of Examples 39–41 would be higher in oxygen index than the polystyrene resin compositions containing the silicone resins free of those characteristics in Comparative Examples 20–21, and polystyrene resin compositions free of silicone resin in Comparative Example 19. The flame retardant resin compositions of Examples 39–41 are higher in flame retardancy than Comparative Examples 19–21.

Tables 11 and 12 show results of co-use the silicone resins (6, 9, 11) with silica powder to improve the mixability, even the silicone resins (6, 9, 11) are low in the weight-average molecular weight and have a high mol ratio of D-units and then have somewhat problem in poor mixability.

TABLE 11

| | Com. Ex. 22 | Com. Ex. 23 | Com. Ex. 24 |
|---|---|---|---|
| Polycarbonate (non-silicone) | 100 | 100 | 100 |
| Silicone resin "6" | 4 | 9 | — |
| Silicone resin "9" | — | — | 4 |
| Silicone resin "11" | — | — | — |
| Evaluation (mixability) | Δ | Δ | Δ |

*○: good (smooth discharge of resin from mixer) (Unit: parts by weight)

TABLE 11-continued

Δ: not good (sometimes disturbed discharge of resin from mixer)
×: bad (so disturbed discharge of resin from mixer as to prevent palletizing)

| | Com. Ex. 25 | Com. Ex. 26 |
|---|---|---|
| Polycarbonate (non-silicone) | 100 | 100 |
| Silicone resin "6" | — | — |
| Silicone resin "9" | — | — |
| Silicone resin "11" | 4 | 9 |
| Evaluation (mixability) | Δ | Δ |

*○: good (smooth discharge of resin from mixer) (Unit: parts by weight)
Δ: not good (sometimes disturbed discharge of resin from mixer)
×: bad (so disturbed discharge of resin from mixer as to prevent palletizing)

TABLE 12

| | Example 42 | Example 43 | Example 44 |
|---|---|---|---|
| Polycarbonate (non-silicone) | 100 | 100 | 100 |
| Silicone resin "6" | 4 | 4 | — |
| Silicone resin "9" | — | — | 4 |
| Silicone resin "11" | — | — | — |
| Silica A | 1 | — | 1 |
| Silica B | — | 0.5 | — |
| Evaluation (mixability) | ○ | ○ | ○ |

*○: good (smooth discharge of resin from mixer) (Unit: parts by weight)
Δ: not good (sometimes disturbed discharge of resin from mixer)
×: bad (so disturbed discharge of resin from mixer as to prevent palletizing)

| | Example 45 | Example 46 | Example 47 |
|---|---|---|---|
| Polycarbonate (non-silicone) | 100 | 100 | 100 |
| Silicone resin "6" | — | — | — |
| Silicone resin "9" | — | — | — |
| Silicone resin "11" | 4 | 4 | 9 |
| Silica A | 1 | — | — |
| Silica B | — | 0.5 | 1 |
| Evaluation (mixability) | ○ | ○ | ○ |

*○: good (smooth discharge of resin from mixer) (Unit: parts by weight)
Δ: not good (sometimes disturbed discharge of resin from mixer)
×: bad (so disturbed discharge of resin from mixer as to prevent palletizing)

From Examples 42–47 and Comparative Examples 22–26, it is understood that the mixability was improved by co-use of the silicone resins (6, 9, 11) having problems in mixability and inorganic fillers such as silica powders. It is preferable that the amount of silica to be added is not less than 0.1 times and an average diameter is in the range of not less than 10 nanometers to not more than 30 micrometers. If the average diameter is larger than 30 micrometers, then the flame retardancy is lowered, If, however, the average diameter is smaller than 10 nanometers, then the problem in danger in operation is raised.

The foregoing examples have shown that the flame retardant resin composition is remarkably improved in flame retardancy, which comprises a silicone resin having both $R_2SiO_{1.0}$ units and $RSiO_{1.5}$ units and a non-silicone resin having aromatic ring, wherein a weight-average molecular weight of the silicone resin is not less than 10,000 to not more than 270,000 and also R is hydrocarbon group, especially a mixture of phenyl and methyl.

In the safety standard (UL94) in the combustion test determined by Underwriters Laboratories, the flame retardant resin compositions have sufficient flame retardancy compared with the conventional flame retardant resin compositions.

The above improvement in flame retardancy of the flame retardant resin composition allows a reduction in amount of silicone resin composition to be added and also the resin composition is improved in properties such as moldability and mechanical strength.

The above improvement in flame retardancy of the flame retardant resin composition fiber allows the resin composition to be burnable with no generation of harmful gas even no further flame retarder such as halogen compounds, combinations of halogen compounds with antimony oxide and phosphorus compounds is added. The flame retardant resin composition is sufficiently safe and provides less damaging to environment.

It is possible to use the above flame retardant resin composition together with other flame retarders to obtain a synergistic effect of high flame retardancy. Notwithstanding, it is also possible to largely reduce the amount in use of the silicone resin and other flame retarder.

The flame retardant resin composition comprises a silicone resin having both $R_2SiO_{1.0}$ units and $RSiO_{1.5}$ units and a non-silicone resin having an aromatic ring, a weight-average molecular weight of said silicone resin is in the range of not less than 10000 to not more than 270,000 and also R is hydrocarbon group.

The above improved resin composition is burnable with no generation of harmful gas even no further flame retarder is added and also improved in moldability and in mechanical strength.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A flame retardant resin composition which comprises a silicone resin and a non-silicone resin having aromatic ring, wherein said silicone resin has $R_2SiO_{1.0}$ units and $RSiO_{1.5}$ units, a weight-average molecular weight of said silicone resin is in the range of not less than 10,000 and not more than 270,000, R is hydrocarbon group, and a mol ratio of the $RSiO_{1.5}$ units to the $R_2SiO_{1.0}$ units in said silicone resin is in the range of 0.5 to less than 7.

2. The flame retardant resin composition as claimed in claim 1, wherein said non-silicone resin comprises at least one selected from the group consisting of aromatic polycarbonate resins, alloys of aromatic polycarbonate resin, copolymers of acrylonitrile-butadiene-styrene, polystyrene resins, epoxy resins having aromatic ring and phenol resins having aromatic ring.

3. The flame retardant resin composition as claimed in claim 1, wherein R comprises a methyl group and a phenyl group.

4. The flame retardant resin composition as claimed in claim 4, wherein a mol ratio of said phenyl group to R of said silicone resin is in the range of not less than 40% to less than 80%, and the remaining R is methyl group.

5. The flame retardant resin composition as claimed in claim 1, wherein said non-silicone resin including said aromatic-ring is one selected from the group consisting of aromatic polycarbonate resins and alloys of aromatic polycarbonate.

6. The flame retardant resin composition as claimed in claim 1, wherein said silicone resin comprises $R_2SiO_{1.0}$ unit, $RSiO_{1.5}$ unit and $R'_3SiO_{0.5}$ unit, and wherein R' is at least one selected from the group consisting of a saturated hydrocarbon group and an aromatic hydrocarbon group.

7. The flame retardant resin composition as claimed in claim 1, wherein said silicone resin comprises $R_2SiO_{1.O}$ unit, $RSiO_{1.5}$ unit and $R'_3SiO_{0.5}$ unit, and wherein R' is a mixture of at least first one selected from the group consisting of a saturated hydrocarbon group and an aromatic hydrocarbon group with at least second one selected from the group consisting of a hydroxyl group and an alkoxyl group.

8. The flame retardant resin composition as claimed in claim 7, wherein, in R' of said silicone resin, said at least second one selected from the group consisting of said hydroxyl group and said alkoxyl group is less than 10% and the remaining is said at least first one selected from the group consisting of said saturated hydrocarbon group and said aromatic hydrocarbon group.

9. The flame retardant resin composition as claimed in claim 1, wherein an inorganic filler is included as a reinforcing agent.

10. The flame retardant resin composition as claimed in claim 8, wherein said inorganic filler is silica powder.

11. The flame retardant resin composition as claimed in claim 8, wherein said inorganic filler is calcium carbonate powder.

12. The flame retardant resin composition as claimed in claim 8, wherein said inorganic filler is talc powder.

13. The resin of claim 1, wherein the weight-average molecular weight of the silicone resin is not less than 12,000 and not more than 270,000.

14. The resin of claim 1, wherein the weight-average molecular weight of the silicone resin is not less than 40,000 and not more than 270,000.

15. The resin of claim 1, wherein the mol ratio of $RSiO_{1.5}$ units to $R_2SiO_1$ units is at least 1 and less than 7.

16. The resin of claim 1, wherein said non-silicone resin comprises benzene rings.

* * * * *